Figure 1:
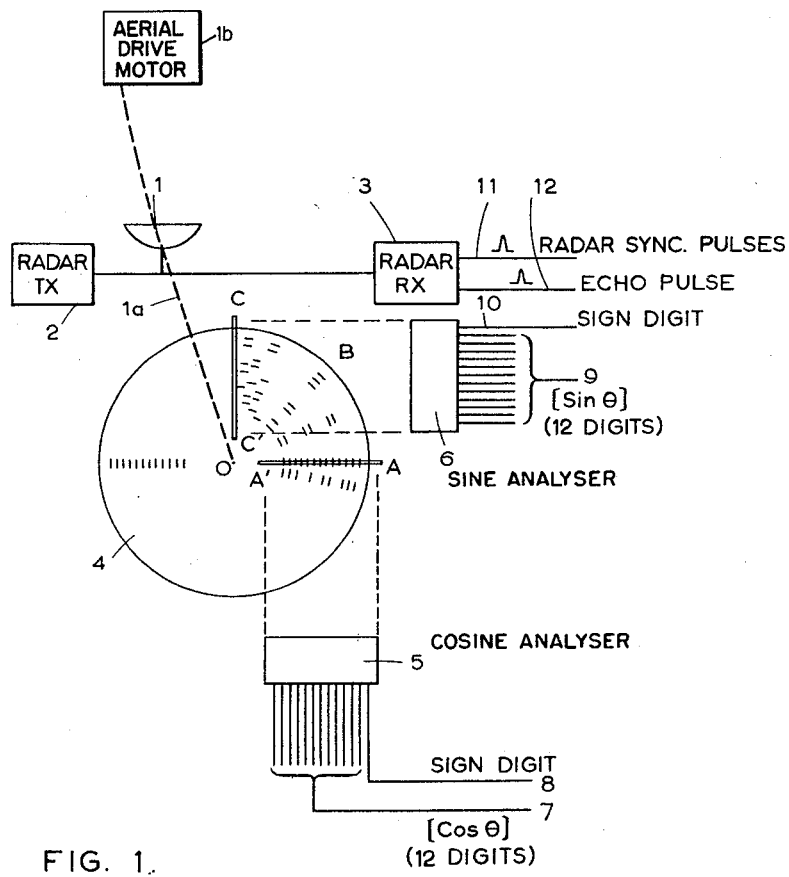

April 13, 1965  E. L. C. WHITE ETAL  3,178,709
RADAR APPARATUS
Filed June 30, 1960  2 Sheets-Sheet 1

Inventors
E.L.C.White
R.Voles
By Mason Downing Seebee
Attys.

United States Patent Office 3,178,709
Patented Apr. 13, 1965

3,178,709
RADAR APPARATUS
Eric Lawrence Casling White, Iver, and Roger Voles, Chiswick, London, England, assignors to Electric & Musical Industries Limited, Hayes, Middlesex, England, a company of Great Britain
Filed June 30, 1960, Ser. No. 40,045
Claims priority, application Great Britain, July 4, 1959, 23,043/59
10 Claims. (Cl. 343—11)

This invention relates to radar apparatus, especially for air surveillance systems, such as required for large civil airports.

In such systems it is becoming increasingly desirable that radar signals relating to the position of aircraft in a given area should be communicated directly to display beams at a central control point which may be many miles from the radar transmitting and receiving means. Usually however radar information is produced in the form of electrical analogue signals and it is difficult to transmit analogue signals to a distant point without distortion, with consequent loss of accuracy which may be serious in some cases.

One object of the present invention is to reduce the above difficulties by providing improved radar apparatus comprising means for deriving at least one digital code signal which is a function of the direction of emission of the radar pulses. Another object of the present invention is to provide improved radar apparatus having digital-to-analogue converting means for converting digital code signals representing the direction of emission of radar pulses to derive a signal which is an analogue representation of said direction.

Preferably where the direction of emission is determined by a rotating or oscillating aerial, means are provided for deriving two digital code signals representing respectively the sine and cosine of the bearing angle of the aerial and the converting means is arranged to derive two signals which are analogue representations of two Cartesian co-ordinates of a radar scan. In some cases the converting means may be associated with a cathode ray display tube the beam of which is deflected in response to said analogue signals, and is intensity modulated by a received radar echo signal to produce a visible indication of the position of a target giving rise to the echo signal.

In accordance with a feature of the invention the same converting means is arranged to operate on a time sharing basis so as to derive not only analogue signals representing a radar scan but also analogue signals representing marker position co-ordinates, the latter signals being derived in response to digital code signals which may be produced manually or by an automatic tracking circuit.

This feature of the invention has the advantage that the switching between scan and markers is carried out before the conversion to analogue signals. Therefore the precise accuracy and linearity of the amplifiers in the cathode ray tube deflection circuits is unimportant provided they have good short term stability, since the amplifiers are used merely to compare radar and marker positions and any errors may be expected to be the same for both radar and marker positions when these are coincident.

In order that the present invention may be clearly understood and readily carried into effect, the invention will be described in greater detail with reference to the accompanying drawings, in which—

Figure 2:
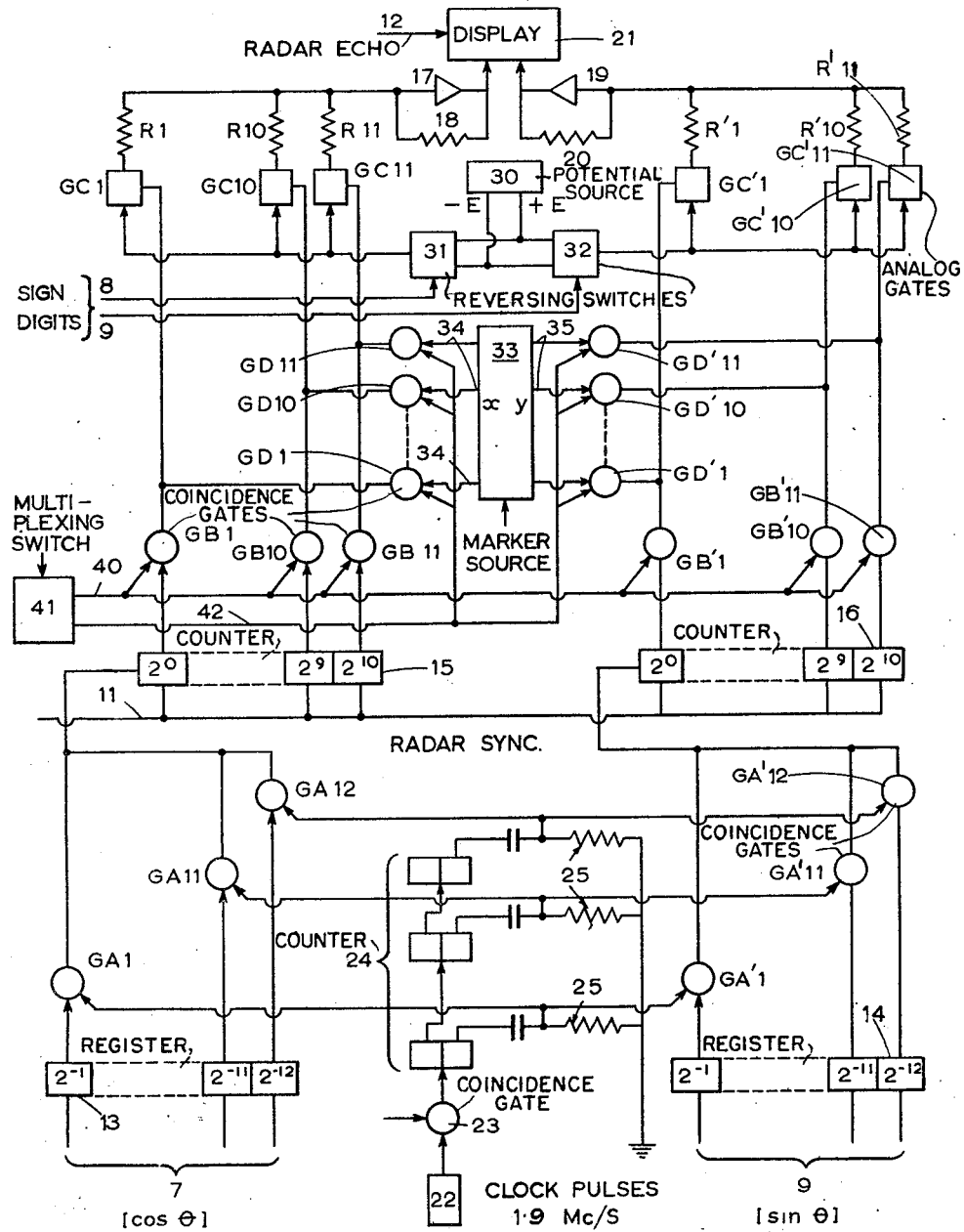

FIGURE 1 represents diagrammatically, and mainly in block form, the transmitting and receiving means of radar apparatus according to one example of the invention, such apparatus being for example suitable for air traffic control, and FIGURE 2 illustrates diagrammatically and mainly in block form, digital to analogue converting means for use with the transmitting and receiving means illustrated in FIGURE 1.

Referring to the drawing, reference 1 represents the scanning aerial of radar apparatus, the aerial being coupled to a radar transmitter 2 and a radar receiver 3, in known manner. In operation of the transmitting and receiving means, the aerial is rotated continuously about a vertical axis, by a suitable motor, $1b$, and a code carrier 4 is mounted on the shaft $1a$ of the aerial so as to rotate therewith. The code carrier may have a variety of forms, for example it may be a disc or drum, but it will be assumed that in the present example it comprises a generally opaque disc having transmitting elements at selected positions. The transmitted elements are distributed both angularly and radially in such a way that on any one radius the elements are a digital code representation of the magnitude and sign of the cosine of the angular displacement of that radius from an initial radius. In FIGURE 1 the initial radius is represented by the line OA, and therefore the transparent elements on this radius are a digital code representation of "+1." Twelve elements are provided for the representation of magnitude and a thirteenth element is provided as an indication of sign. The transparent elements on the radius OB, 45° from OA, are a digital code representation of +0.707 . . ., namely cosine of 45° and so on. The disc 4 is associated with two analysers mounted at fixed positions which are 90° apart relative to the rotation axis of the disc 4. The construction of the analysers is not shown in the drawings, but in the present example each analyser comprises means for illuminating the discs through a narrow radial aperture, the aperture in the case of the first analyser being represented by AA' and that in the case of the other analyser being represented by CC' displaced angularly by 90° from AA'. The apertures transmit elements of light through the code elements on the disc under the respective apertures. Each analyser further comprises photo-electric cells for converting the light elements into electrical signals in corresponding code. The photo-electric cells in the case of one analyser (the cosine analyser) are represented generally by the rectangle 5 and in the case of the other analyser (the sine analyser) by the rectangle 6. If desired, it can be arranged that the illumination of the code disc 4 through the apertures occurs only momentarily in synchronisation with the emission of radar pulses from the radar aerial 1. The signals from the photo-electric cells 5 and 6 are in parallel mode and the signal is received by thirteen conductors from each group of photo-electric cells. Twelve of the conductors, denoted collectively by the reference 7, from the group of photo-electric cells 5 receive a digital representation of the magnitude of cosine of the angle of the radar aerial, denoted herein by $\theta$ whereas the thirteenth conductor 8 receives the sign indication. Furthermore, by reason of the 90° displacement between the two analysing apertures, twelve of the conductors denoted collectively by the reference 9 from the group of photo-electric cells 6 receives a digital code representative of the magnitude of sin $\theta$ whereas the thirteenth conductor 10 receives the sign indication. The elements on the disc 4 are in a cyclic permutation binary code which is such that on changing from one number to the next number, only one binary digit changes. It will be understood that the signal representing cos $\theta$ from 5 will comprise pulses of positive polarity say, in a selection of the twelve output conductors whilst the sign digit will comprise either a pulse or no pulse to denote the sign, in some cases a pulse denoting a positive sign, in other cases denoting a negative sign depending on the code permutation. The signals from 6 are of the same nature. The signals in the conductors 7 to 10 are transmitted by a radio link or in any other suitable manner to a central control point, which may be many miles from the radar transmitting and receiving means, and the radar receiver is connected to the central control point by two further channels, denoted by 11 and 12, the channel 11 being arranged to convey radar synchronising pulses synchronised with the pulses emitted from the aerial 1. The channel 12 on the other hand is arranged to convey any echo pulses received by the aerial 1.

The central control point is provided with digital to analogue converting means, shown in FIGURE 2, responsive to the digital code signals from 5 and 6 to derive signals which are analogue representations of Cartesian co-ordinates of the radar scan. The signals representing cosine and sine $\theta$ are converted to conventional binary code, by known means, as a result of which the sign digit when it comprises a pulse will denote exclusively one sign, say the positive sign, and when it comprises no pulse will denote exclusively the other sign. After conversion to conventional binary code, the code elements which represent the magnitude of cosine $\theta$ and sine $\theta$ are applied to two binary registers 13 and 14, these registers having twelve stages corresponding to the twelve conductors 7 and 9 respectively. The registers 13 and 14 are arranged to staticize the binary code representations received from the conductors 7 and 9. It will be understood therefore that at any instant the output leads from the various stages of the registers 13 and 14 will be energised or not with a positive potential according to the magnitude of cosine and sine $\theta$. A series of coincidence gates GA1 ... GA12 are provided in the output leads from the register 13, and the output leads of the gates GA1 ... GA12 are applied in common to the input of a binary counter 15 which has eleven stages as indicated. The stages of the counter 15 have individual output leads in which are provided coincidence gates GB1 ... GB11, and the output leads of these gates are in turn applied to a series of bi-directional analogue gates GC1 ... GC11. Similarly the outputs of gates GA′1 ... GA′12 in the leads from the register 14 are applied in common to a binary counter 16, the output leads from the stages of which include gates GB′1 ... GB′11 and GC′1 ... GC′11, which correspond respectively to the gates GB and GC. The outlet leads from the analogue gates GC1 ... GC11 are connected by resistors R1 ... R11 to the input terminal of a high gain amplifier 17. The amplifier has a negative feedback path formed by a resistor 18, and the magnitudes of the resistors R1 and R11 are such that the resistor R1 has twice the resistance of R2, the resistor R2 has twice the resistance of R3 and so on. The output leads of the gates GC′ similarly include resistors R′1 ... R′11 and they are connected in common to the input electrode of a high gain amplifier 19 which is the same as the amplifier 17 and has a similar negative feedback resistor 20. The output signals from the amplifiers 17 and 19 are fed to a display device represented by the rectangle 21 in which the output signals are used respectively to produce $x$ and $y$ co-ordinate displacements of the beam of a cathode ray display tube.

The rectangle 22 represents a source of clock pulses which in the represent example have a frequency of 1.9 mc./s. These pulses are applied via a coincidence gate 23 to the first stage of a binary counter 24. The counter has twelve stages each of which but the last is coupled to the next stage in known manner. An output lead is moreover taken from each stage in such a way that a positive potential appears on that output lead each time the respective stage is changed from its "0" condition to its "1" condition, that is when the respective stage changes its state without producing a carry. These positive potentials are differentiated by differentiating circuits 25 to produce short output pulses when changes from "0" to "1" occur, and the short pulses are applied to the input terminals of the coincidence gates GA1 ... GA12 and similarly to the input terminals of the gates GA′1 ... GA′12. The first stage of the counter 24 produces output pulses at half the clock pulse frequency, the second stage produces output pulses at a quarter of the clock pulse frequency and so on, the relative phases of the pulses being such that no two output pulses coincide. A series of pulse trains are therefore applied to the second input terminals of the gates GA1 ... GA12.

The coincidence gate 23 receives a second input from a control signal source, which may for example be under manual supervision to initiate operation of the apparatus. When the control signal is set up, clock pulses from 22 are applied to the counter 24 and this conditions the apparatus to respond to the signals conveyed by the channels 7 to 12. The synchronising pulses from the conductor 11 are applied to the resetting bus bars for the counters 15 and 16 and this ensures that these counters are restored to the empty condition (if they are not previously in that condition) each time a radar pulse is emitted from the aerial 1. Moreover when a radar pulse is emitted from the aerial 1, the registers 13 and 14 receive a binary code representation of the magnitudes of cosine and sine $\theta$. Therefore a combination of the gates GA is conditioned to transmit pulses from the stages of the counter 24 depending upon cos $\theta$ and as the pulses from the stages occur at rates which are related to one another according to a binary series, it will be understood that the pulses which are applied to the register 15 in a given period of time are proportional to cos $\theta$, to an accuracy of $\pm \frac{1}{2}$ a pulse each pulse from the source 22 representing a given displacement. Similarly the pulses applied to the register 16 are proportional to the magnitude of sine $\theta$. The clock pulse rate is so chosen that the counter 15 is filled in the time for maximum range when all the gates GA are open (cosine $\theta=1$) and similarly the counter 16 is filled in the time for maximum range when all the gates GA′ are open (sine $\theta=1$), the time for maximum range being the time between a radar synchronising pulse on the conductor 11 and an echo pulse on the conductor 12 from a target at the maximum range of the radar apparatus.

The second input terminals of the gates GB and GB′ are connected in common to a conductor 40 to which is applied switching signals for multiplexing purposes. The switching signals are derived from a multiplexing switch 41. Moreover the gates GC and GC′ are employed to apply an analogue reference potential from a source 30 to the amplifiers 17 and 19 via a selection of the resistors R and R′. The source 30 has two output terminals from which can be derived two unidirectional potentials of the same magnitude, say E, but of opposite polarity, the magnitude E being arranged to correspond (when all the gates GC are open) to maximum range on the scale of the display device 21. Reversing switches 31 and 32 are probided between the source 30 and the gates GC and GC′. The switch 31 is operated by the sign digit signal from the channel 8 (after conversion to conventional binary code) in such a way that $+E$ is applied to the gates GC when cos $\theta$ is positive and $-E$ is applied to the gates GC when cos $\theta$ is negative. Similarly, the switch 32 is operated by the sign digit signal from the channel 10 in such a way that $+E$ is applied to the gates GC′ when sine $\theta$ is positive and $-E$ is applied to the gates GC′ when sine $\theta$ is negative. Bearing these considerations in mind, and also bearing in mind that the counters 15 and 16 are reset by each radar synchronising pulse, it will be understood that when the gates GB are open, then at any instant a selection of the analogue gates GC is open corresponding (within limits of accuracy determined by the pulses from 24) to R cos $\theta$, where R is the radar range. This is a digital representation of the $x$ component of the radar scan and it is converted, in known manner, into an analogue representation by the action of the amplifier 17 in summing the currents flowing in those of the resistors R1 to R11 connected to the open gates GC. Similarly when the gates GB' are open (as they are whenever the gates GB are open) then at any instant a selection of the analogue gates GC' is open corresponding to R sin $\theta$, namely, the $y$ component of the radar scan, and this digital representation is converted into an analogue representation by the action of a summing amplifier 19. The output signals from the amplifiers 17 and 19 are therefore the $x$ and $y$ potentials required to deflect the beam in a cathode ray display tube. Radar echo signals in the channel 12 are applied as beam-bright-up pulses to the tube.

The converting means of the apparatus described is also arranged to operate, on a time sharing basis, so as to derive not only analogue signals representing target position co-ordinates, but also analogue signals representing marker position co-ordinates. Thus, in the drawing the reference 33 may represent a source of digital code signals corresponding to two marker co-ordinates. The marker signal source 33 has two sets of output conductors 34 and 35 arranged respectively to receive digital code signals representing the $x$ and $y$ co-ordinates of the marker. These conductors include gates GD1 to GD11 and GD'1 to GD'11 which are counterparts of the gates GB and GB', and receive switching signals from the multiplexing switch 41 by a conductor 42. When the gates GD and GD' are open, the conductors 34 apply the $x$ co-ordinate signals to the analogue gates GC and similarly the conductors 34 apply to $y$ co-ordinate signals to the analogue gates GC'. The multiplexing switch 44 is moreover arranged to operate in such a way as to interleave the marker signals with radar paints, the latter being of course initiated in synchronism with the emission of radar pulses from the aerial. The marker signals may be generated under manual control or may alternatively be derived from an automatic tracking circuit. It will be understood that with this arrangement a marker will move by a discrete step, when a digital code signal representing its $x$ and $y$ co-ordinates is changed, as does the radar scan.

In practice there may be a plurality of sources of marker signals each with sets of gates corresponding to GD and GD', in which case the multiplexing switch is arranged to select the marker sources in cyclic order and interleave them, one at a time, between successive radar paints. The multiplexing switch 41 may in that case comprise one high speed set of switches and a low speed selector which may be a mechanical switch. Each separate marker source may have a self contained tracking circuit comprising for each co-ordinate axis two register accumulators one for displacement (say $x$) and the other for rate (say $\dot{x}$). In that case means are provided for adding at regular intervals the content of each rate accumulator to that of the corresponding displacement accumulator, without destroying the content of the rate accumulator. When the coincidence between the marker and the appropriate echo signal is imperfect, manual movement of a joystick or other means is arranged to adjust the contents of the displacement and rate accumulators, the former showing directly how much correction is being achieved and the latter making appropriate modification to the rate to improve subsequent prediction.

Instead of generating the two sets of pulses with rates proportional to the magnitudes of cos $\theta$ and sin $\theta$ respectively by subdividing the frequency of clock pulses in a binary counter, such sets of pulses can be generated by two variable frequency pulse generators. The frequency of one generator is controlled by letting pulses therefrom run into a counter and after a time corresponding to maximum range comparing the content of the counter with A cos $\theta$ where A is a power of 2 any error detected by the comparison being used to adjust the frequency of the generator. The frequency of the other generator is similarly controlled but the content of the counter is compared in this case with A sin $\theta$. Representations of cos $\theta$ and sin $\theta$ are derived from a coded disc on the aerial shaft, as described in the case of FIGURE 1.

Instead of intermittently illuminating the apertures of the analyzers associated with the code disc 4, the apertures may be continuously illuminated, in which case the radar synchronizing pulse may be employed to gate the conductors 7 and 9 so as to apply representations of cos $\theta$ and sin $\theta$ to the registers 13 and 14 in synchronism with each emitted radar pulse.

Magnetic core circuits may be used for the counters and registers.

Instead of employing the apparatus described to produce the deflecting waveforms for a cathode ray display tube, to which the radar echo is applied a bright-up pulse, the radar echo may be employed to write target positions into a digital store, for example by operating gates similar to GB and GB'.

What we claim is:

1. Radar apparatus comprising means for causing the emission of radar pulses in a series of directions, a record carrier on which are recorded digital code representations of said directions, sampling means for sampling the record on said record carrier in timed relationship with the emission of radar pulses, and means for producing relative displacement of said sampling means and said record carrier to cause said relative displacement to represent the direction of emission of said pulses, whereby said sampling means produces successive representations in digital code of the direction of emission.

2. Apparatus according to claim 1, wherein said digital code is a binary code.

3. Apparatus according to claim 1 comprising an aerial for determining the direction of emission of the radar pulses, means for varying the angular bearing of said aerial to change said direction, said record carrier comprising representations of the sines of successive angles, and said sampling means comprises means for simultaneouly sampling the record for angles which are 90° apart to produce individual representations in digital code of the sine and cosine of the aerial bearing.

4. Apparatus according to claim 3 comprising means for providing a plurality of series of pulses, the repetition frequencies of the pulses of the different series being related as the different orders of said digital code, two pulse counters, means for selectively gating said series of pulses to one of said counters in response to the digital code representation of the sine of the aerial bearing, means for selectively gating said series of pulses to the other counter in response to said digital code representation of the cosine of the aerial bearing, and means for producing two analogue signals of which the magnitudes vary respectively according to the counts of said counters thereby to produce analogue representations of two components of the radar range.

5. Apparatus according to claim 4, wherein said analogue representations are employed respectively to produce scanning deflections in a radar display device.

6. Apparatus according to claim 5 comprising means responsive to received radar echos to produce brightness modulation in said display device.

7. Radar apparatus comprising means for causing the emission of radar pulses in a series of directions, means for producing successive representations in digital code of said directions, means for providing a plurality of series of pulses, the repetition frequencies of the pulses in the different series being related as the different orders of said digital code, a pulse counter, means for selectively gating said series of pulses to said counter in response to said digital code representation and means for producing an analogue signal of which the magnitude varies according to the count of said counter thereby to produce an analogue signal which is a function of the radar range.

8. Radar apparatus according to claim 7 comprising means for re-setting the counter in timed relationship with the emission of radar pulses.

9. Radar apparatus according to claim 7 wherein the said means for producing digital code representations of the direction of emission of radar pulses are mechanically coupled to said means for causing the emission of radar pulses and is situated at a distance from and coupled by an electrical signal transmission means to at least said means for producing an analogue signal of which the magnitude varies according to the count of said counter.

10. Radar apparatus comprising means for causing the emission of radar pulses in a series of directions, and means for producing successive representations in digital code of said directions, means for producing a representation of a marker in digital code, digital to analogue converting means, and means for alternately gating said direction representations and said marker representation to said converting means.

References Cited by the Examiner

UNITED STATES PATENTS

| | | | |
|---|---|---|---|
| 2,634,368 | 4/53 | Johnson | 343—7 |
| 2,986,728 | 5/61 | Hinckley | 343—7 |

CHESTER L. JUSTUS, *Primary Examiner.*

KATHLEEN CLAFFY, FREDERICK M. STRADER,
*Examiners.*